United States Patent [19]
Krillenberger

[11] Patent Number: 5,307,543
[45] Date of Patent: May 3, 1994

[54] CLIP FOR ATTACHING THERMOSTATS TO PIPES

[75] Inventor: James M. Krillenberger, Bellville, Ohio

[73] Assignee: Therm-O-Disc, Incorporated, Mansfield, Ohio

[21] Appl. No.: 5,801

[22] Filed: Jan. 19, 1993

[51] Int. Cl.⁵ .......................... A44B 21/00; F16L 3/00
[52] U.S. Cl. .................................... 24/543; 24/545; 248/74.2; 174/84 C
[58] Field of Search ............. 24/543, 542, 545, 703.1; 248/71, 73, 74.2; 174/84 C

[56] References Cited

U.S. PATENT DOCUMENTS

| | | | |
|---|---|---|---|
| 2,972,461 | 2/1961 | Balbach et al. | 248/73 |
| 2,996,275 | 8/1961 | Holton | 248/73 |
| 3,515,363 | 6/1970 | Fisher | 248/71 |
| 3,901,480 | 8/1975 | Basile et al. | 24/543 |
| 4,564,163 | 1/1986 | Barnett | 248/71 |
| 5,108,055 | 4/1992 | Kreinberg et al. | 248/74.2 |
| 5,164,545 | 11/1992 | Kreinberg et al. | 174/84 C |

*Primary Examiner*—Victor N. Sakran
*Attorney, Agent, or Firm*—Jones, Day, Reavis & Pogue

[57] ABSTRACT

A one-piece clip for attaching thermostats to pipes has a peripheral wall that is circumferentially interrupted to define adjacent end portions that are reversely bent into cooperative hooks. The clip has a top portion attachable to a thermostat and an opposite bottom portion that is positionable on the opposite side of a pipe from the thermostat. The clip is resiliently deformable to move the hooks into interengaged relationship and the clip then holds the thermostat against the pipe.

9 Claims, 2 Drawing Sheets

5,307,543

CLIP FOR ATTACHING THERMOSTATS TO PIPES

BACKGROUND OF THE INVENTION

This application relates to the art of clips and, more particularly, to clips used for attaching or mounting one article to another. The invention is particularly applicable to clips used for attaching thermostats to pipes and will be described with specific reference thereto. However, it will be appreciated that the invention has broader aspects and can be used for other purposes.

Thermostats are commonly attached to coils of heat exchangers for sensing the temperature thereof. Clips used to attach the thermostat to a heat exchanger coil are often difficult to assemble, particularly in blind or one-handed installations. Many clips of this type are easily dislodged or are not suitable for attaching thermostats to reversely curved exposed end coils of heat exchangers.

It would be desirable to have a secure and easily installed clip that would also be capable of attaching thermostats to exposed reversely curved end coils of heat exchangers.

SUMMARY OF THE INVENTION

A clip of the type described has a peripheral wall that is circumferentially interrupted to define adjacent end portions that are reversely bent into cooperatively engagable hooks. The peripheral wall is resiliently deformable to move the hooks toward one another and into cooperative interengaged relationship.

The clip surrounds a heat exchanger pipe and a thermostat, and resiliently urges the thermostat into engagement with the pipe. The clip is attached to the thermostat, and is installed by positioning same around a heat exchanger pipe and then squeezing the clip with one hand to engage the hooks.

In a preferred arrangement, the shape of the peripheral wall is such that it includes generally opposite top and bottom portions and opposite side portions. The cooperative hooks are in one of the side portions intermediate the top and the bottom potions.

The top portion of the clip peripheral wall has a substantially flat top central portion with a pair of opposite arms extending outwardly and upwardly therefrom. The substantially flat top central portion of the clip peripheral wall has a fastener receiving hole therethrough for attaching the clip to a thermostat. Longitudinal stiffening ribs are preferably provided in the substantially flat top central portion on opposite sides of the fastener receiving hole.

The bottom portion of the clip peripheral wall includes a bottom central portion that is generally V-shaped for receiving a heat exchanger pipe. The generally V-shaped bottom central portion has a substantially reduced width provided by inwardly curved opposite side edges to facilitate mounting on reversely curved exposed end coils of a heat exchanger.

It is a principal object of the present invention to provide an improved one-piece spring clip for use in attaching thermostats to heat exchanger coils.

It is also an object of the invention to provide such a clip that can be installed with one hand and is also suitable for attaching thermostats to exposed end coils of heat exchangers.

DESCRIPTION OF A PREFERRED EMBODIMENT

Figure 1:
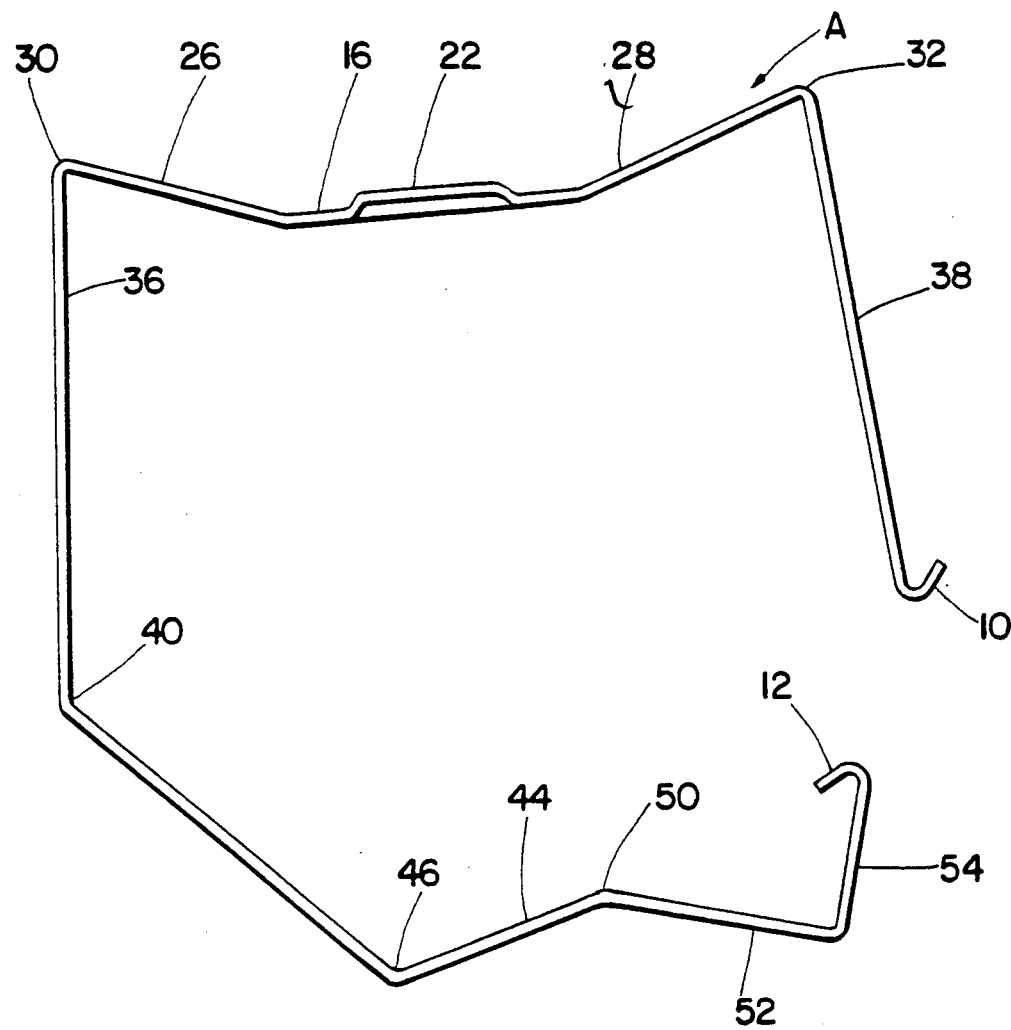
FIG. 1 is an elevational view of a one-piece spring clip constructed in accordance with the present application.
Figure 5:
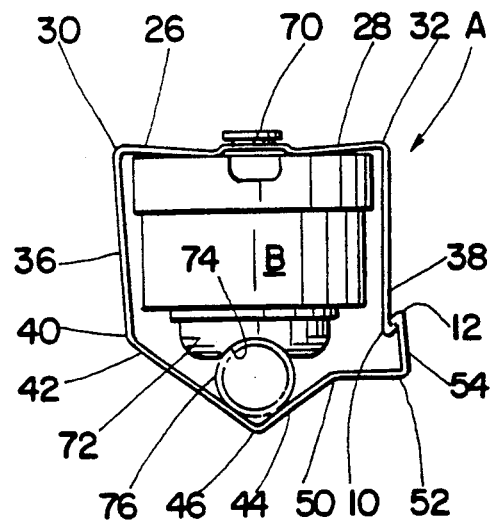
FIG. 5 is an elevational view showing the clip in assembled relationship attaching a thermostat to a heat exchanger pipe.

Referring now to the drawing, wherein the showings are for purposes of illustrating a preferred embodiment of the invention only and not for purposes of limiting same, FIG. 1 shows a one-piece spring clamp A having a peripheral wall that is circumferentially interrupted to define spaced-apart end portions 10, 12 that are reversely bent into cooperative hooks. Squeezing the clip moves hooks 10, 12 toward one another until they become interdigitated as shown in FIG. 5.

Clip A includes a top portion having a substantially flat top central portion 16 with a centrally located circular hole 18 therethrough for receiving a rivet to attach the clip rotatably to a thermostat housing. Substantially flat top central portion 16 has longitudinal stiffening ribs 20, 22 formed in the outer edges thereof on opposite sides of hole 18. Ribs 20, 22 reinforce and stiffen flat top central portion 16 against bending in the area of hole 18.

A pair of opposite arms 26, 28 extend outwardly and upwardly from opposite ends of substantially flat top central portion 16. The peripheral wall of clip A is bent at the outer ends of arms 26, 28 as generally indicated at 30, 32 to provide a pair of legs 36, 38 extending downwardly and outwardly from arms 26, 28. One leg 38 has a first leg terminal end portion that is reversely bent into hook 10. The other leg 36 is inwardly bent at 40 generally opposite from hook 10 to define a downwardly inclined first wall portion 42 that intersects an upwardly inclined second wall portion 44 at a generally V-shaped intersection 46.

Upwardly inclined second wall 44 is downwardly bent at 50 to define a third wall 52 having an upwardly extending leg 54 thereon that reversely bent to terminate in hook 12. Hooks 10, 12 on the end portions of legs 38, 54 define cooperating means for releasably connecting legs 38, 54 to one another.

Figure 2:
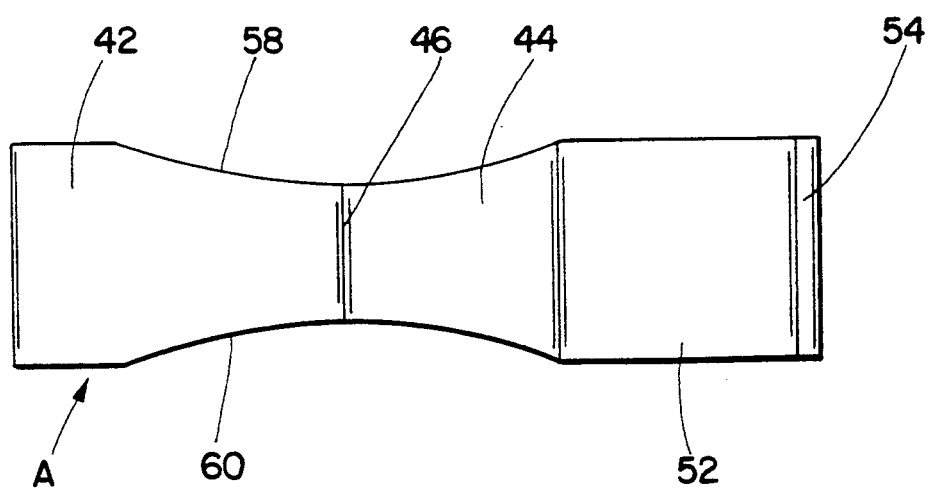
FIG. 2 is a bottom plan view thereof.

The generally V-shaped bottom central portion of clip A has a reduced width provided by inwardly curved opposite side edges 58, 60 as shown in FIG. 2. This facilitates attachment of the clip to end coils of a heat exchanger with the reduced width portion located on the inside of the curve of a curved end coil.

Figure 3:
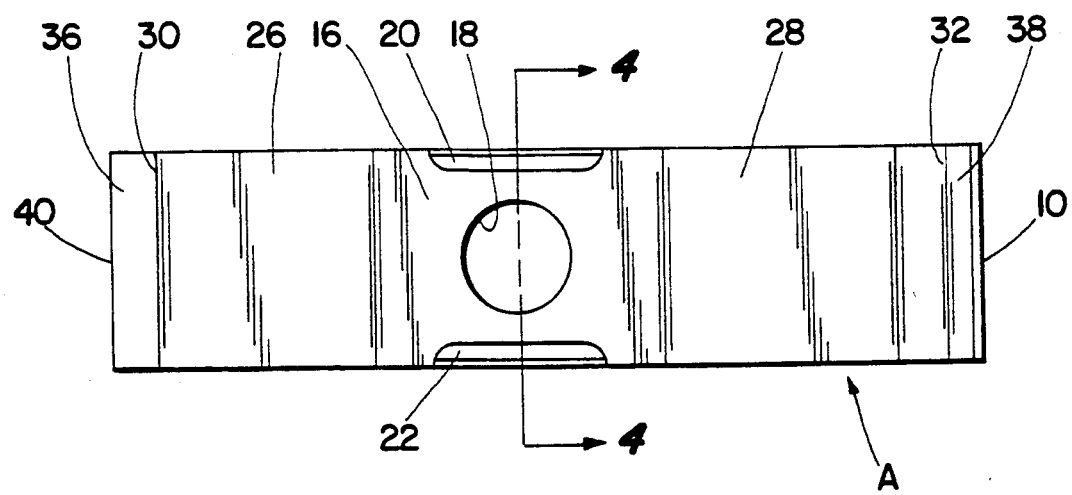
FIG. 3 is a top plan view thereof.
Figure 4:
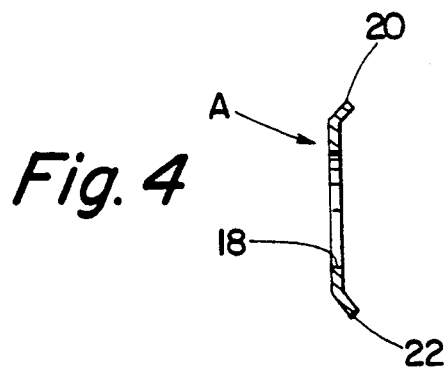
FIG. 4 is a partial cross-sectional elevational view taken generally on line 4—4 of FIG. 3.
Figure 6:
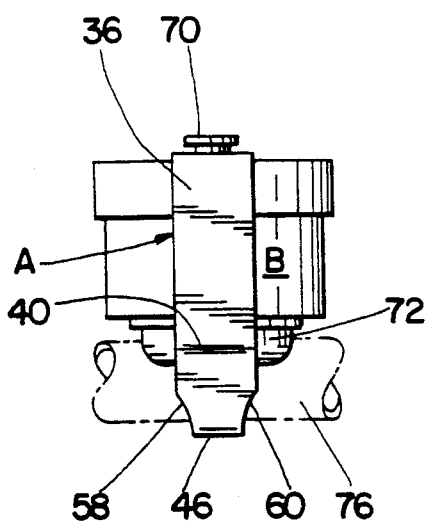
FIG. 6 is a side elevational view of FIG. 5.

FIGS. 5 and 6 show a thermostat B having clip A attached thereto by a headed rivet 70. The shank of rivet 70 extends through hole 18 in flat top central portion 16 of clip A shown in FIG. 3. The enlarged head on rivet 70 is larger than the diameter of hole 18. Relative rotation between clip A and thermostat B may take place around the shank of rivet 70. Thermostat B has a cup 72 that is longitudinally curved as generally indicated at 74 for receiving a pipe 76 on a heat exchanger.

To attach and assemble the clip and thermostat to a pipe, the assembly is manipulated to pass the pipe through the spaced hook end portions 10, 12 of clip A until the pipe is received in the V-shaped bottom central portion of the clip. The top and bottom portions of the clip adjacent legs 38, 54 are then squeezed between a person's thumb and fingers for moving hooks 10, 12 toward one another and into interdigitated engagement. The clip can be removed by pressing laterally on leg 38 to disengage hooks 10, 12. Once installed, the clip is under bending stress, and this holds the hooks interdigitated and biases the thermostat cup into firm engagement with the pipe.

The substantially reduced width of the generally V-shaped bottom central portion of the clip that engages the pipe minimizes the amount of heat that is transferred from the pipe to the clip and also allows secure mounting of the clip to an exposed curved end portion of a heat exchanger coil.

The clip of the present application has generally opposite top and bottom portions and opposite side portions. Hooks 10, 12 are in one side portion defined by legs 38, 54. Leg 38 extending downwardly from the top portion of the clip is substantially longer than leg 54 extending upwardly from the bottom portion of the clip. Substantially straight legs 36, 38 are outwardly inclined when hooks 10, 12 are separated in the relaxed condition of the clip and are inwardly inclined as shown in FIG. 5 when hooks 10, 12 are interdigitated. End portion 10 of leg 38 is reversely bent outwardly to define a hook therein, while end portion 12 of leg 54 is reversely bent inwardly to define a hook thereon.

The clip of the present application may be made in many different sizes to accommodate different sizes of pipes and thermostats. In the arrangement shown and described, the length of substantially flat top central portion 16 is greater than the length of each individual arm 26, 28, while the combined length of the two arms together is greater than the length of substantially flat top central portion 16. Arm 28 is also somewhat longer than arm 26.

Strictly for purposes of example and not for purposes of limitation, the dimensions of one size of clip will be given. The length of substantially flat top central portion is about 0.5 inches, while the length of arm 26 is about 0.375 inches and the length of arm 28 is about 0.4 inches. Arms 26, 28 are upwardly inclined at angles of about 20°. The included angle between arm 26 and leg 36, and between arm 28 and leg 38, is about 75°. The length of legs 36, 38 will vary with the height of the thermostat. In an intermediate clip size, leg 36 has a length of about 0.880 inch, and leg 38 has a length of about 0.840 inch. Wall 42 has a length of about 0.7 inches, and walls 44, 52 each have a length of about 0.375 inches. The included angle between leg 36 and wall 42 at bend 40 is about 130°. The included angle between walls 42, 44 at bend 46 is about 120°. The included angle between walls 44, 52 at bend 50 is about 150°. The length of upwardly extending leg 54 is about 0.260 inches. The end portions of legs 38, 54 are reversely bent into hooks with included angles of about 45°.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A one-piece spring clip having a substantially flat top central portion, a pair of opposite arms extending outwardly and upwardly from said top central portion, a pair of legs extending downwardly and outwardly from said arms, one of said legs having a first leg terminal end portion, the other of said legs being inwardly bent generally opposite from said leg terminal end portion to define a downwardly inclined first wall portion that intersects an upwardly inclined second wall portion at a generally V-shaped intersection, said second wall portion being connected with an upwardly extending leg having a second leg terminal end portion located adjacent said first leg terminal end portion, said first and second leg terminal end portions having cooperating means thereon for releasably connecting same, said clip being resiliently deformable to move said first and second leg terminal end portions toward one another to interengage said cooperating means.

2. The clip of claim 1 wherein said cooperating means comprises hooks and said first leg terminal end portion is reversely bent outwardly to define a hook thereon and said second leg terminal end portion is reversely bent inwardly to define a hook thereon.

3. A one-piece spring clip having a peripheral wall that is circumferentially interrupted to define adjacent end portions that are reversely bent into cooperatively engageable hooks, said peripheral wall being resiliently deformable to move said hooks towards one another and into cooperative interengaged relationship, said peripheral wall including opposite top and bottom portions and opposite side portions, said top portion including a substantially flat top central portion having a central hole therethrough, a pair of opposite arms extending outwardly and upwardly from said substantially flat top central portion, opposite side portions comprising substantially straight legs and extending downwardly and outwardly from said arms, one of said legs terminating in one of said hooks, the other of said legs being bent inwardly generally opposite from said one hook to define said bottom portion, said bottom portion including a first wall inclined downwardly from said other leg and intersecting a second upwardly inclined wall at a generally V-shaped intersection, said second wall intersecting a third wall having an upwardly extending leg thereon terminating in the other of said hooks.

4. The clip of claim 3 wherein said one downwardly extending leg having said one hook thereon is substantially longer than said upwardly extending leg having the other of said hooks thereon.

5. The clip of claim 3 including stiffening ribs in said substantially flap top central portion on opposite sides of said hole therein.

6. A one-piece spring clip including opposite top and bottom portions having generally opposite top and bottom central portions, a pair of opposite resilient arms extending outwardly and upwardly from said top central portion, a continuous side portion extending between one of said means and said bottom portion, an interrupted side portion extending between the other of said arms and said bottom portion and having cooperable interengageable hooks for closing said interrupted side portion, said bottom central portion being spaced further from said top central portion than any other portion of said clip and said clip having no portions thereof located on the opposite side of said bottom central portion from said top central portion either when said hooks are engaged or disengaged, said top and bottom central portions being movable toward one another to clamp elements therebetween and to interengage said hooks, and said arms and said side portions being under resilient bending stress when said hooks are interengaged with elements clamped between said top and bottom central portions illuding a hole in said top central portion, and a thermostat attached to said clip by a fastener extending through said hole.

7. The clip of claim 6 wherein said bottom central portion is generally V-shaped.

8. The clip of claim 6 wherein said bottom central portion has inwardly curved opposite side edges.

9. The clip of claim 6 wherein said top central portion is substantially flat and has a length greater than the length of each of said arms, said arms together having a combined length greater than the length of said substantially flat top central portion.

* * * * *